(12) United States Patent
Fedor et al.

(10) Patent No.: US 8,154,802 B2
(45) Date of Patent: Apr. 10, 2012

(54) CHROMATIC DIFFRACTIVE OPTICAL ELEMENT CORRECTOR, OPTICAL SYSTEM INCLUDING THE SAME AND ASSOCIATED METHODS

(75) Inventors: Adam S. Fedor, Charlotte, NC (US); James E. Morris, Charlotte, NC (US); Michael R. Feldman, Huntersville, NC (US)

(73) Assignee: DigitalOptics Corporation East, Charlotte, NC (US)

( * ) Notice: Subject to any disclaimer, the term of this patent is extended or adjusted under 35 U.S.C. 154(b) by 563 days.

(21) Appl. No.: 12/314,708

(22) Filed: Dec. 15, 2008

(65) Prior Publication Data
US 2009/0190459 A1 Jul. 30, 2009

Related U.S. Application Data

(63) Continuation of application No. PCT/US2007/014222, filed on Jun. 15, 2007.

(60) Provisional application No. 60/813,701, filed on Jun. 15, 2006.

(51) Int. Cl.
*G02B 5/18* (2006.01)
*G11B 7/00* (2006.01)
*G11B 7/135* (2012.01)

(52) U.S. Cl. .................. 359/571; 359/575; 369/112.07

(58) Field of Classification Search .................. 359/569, 359/571, 575; 369/112.06, 112.07, 112.11, 369/112.12
See application file for complete search history.

(56) References Cited

U.S. PATENT DOCUMENTS

| 6,687,037 B2 | 2/2004 | Hendriks et al. |
| 7,170,681 B2 | 1/2007 | Hendriks et al. |
| 7,466,642 B2 * | 12/2008 | Sano et al. ............... 369/112.08 |
| 7,701,832 B2 * | 4/2010 | Tukker et al. ............ 369/112.06 |
| 2002/0118427 A1 * | 8/2002 | Hendriks et al. .............. 359/197 |
| 2005/0083562 A1 | 4/2005 | Hendriks |

FOREIGN PATENT DOCUMENTS

| EP | 1 304 687 A1 | 4/2003 |
| EP | 1 372 147 A2 | 12/2003 |
| EP | 1 500 956 A1 | 1/2005 |

OTHER PUBLICATIONS

European Search Report issued in corresponding application, EP 07 80 9651, dated May 4, 2011.

* cited by examiner

*Primary Examiner* — Alessandro Amari
(74) *Attorney, Agent, or Firm* — Lee & Morse, P.C.

(57) ABSTRACT

An optical element may include a substrate including a diffractive structure having multiple periods, at least one period of the multiple periods having multiple steps, heights of the multiple steps non-monotonically increasing across the at least one period. The optical element may be used with at least two wavelengths, e.g., three wavelengths, may be on a single surface and may provide an efficiency of at least 50% for all wavelengths.

22 Claims, 8 Drawing Sheets

CHROMATIC DIFFRACTIVE OPTICAL ELEMENT CORRECTOR, OPTICAL SYSTEM INCLUDING THE SAME AND ASSOCIATED METHODS

CROSS REFERENCE TO RELATED APPLICATION(S)

This application is a continuation of PCT/US2007/014222, filed Jun. 15, 2007, which claims priority from U.S. Provisional Application No. 60/813,701, filed Jun. 15, 2006, the entire contents of both of which are hereby incorporated by reference.

BACKGROUND OF THE INVENTION

1. Field of the Invention

Embodiments of the present invention are directed to a chromatic diffractive optical element (DOE) corrector. More particularly, the present invention is directed to a DOE corrector for use with multiple wavelengths, associated systems and associated methods.

2. Description of Related Art

Numerous applications require a single objective lens to be used for multiple wavelengths, i.e., at least two wavelengths. This requires chromatic aberrations in the objective lens to be corrected to an acceptable level.

For example, to realize higher optical storage capacity, reduction in beam size is needed. Such reduction may be achieved using a shorter wavelength with a higher numerical aperture objective. However, the shorter the wavelength, the higher the energy of the light. Thus, some traditional media may be damaged using a shorter wavelength. Therefore, to function with traditional media, wavelengths for which that particular medium was designed may still be needed.

A particular application is to high-density digital video disc (DVD) systems that are to remain backwards compatible with DVD and compact disc (CD) formats. In such a system, numerous differences in optical requirements are to be addressed between these formats. For example, all three formats have different wavelengths, different numerical apertures (NAs), different diffraction limited spot sizes, different working distances, and different media thicknesses.

The HD-DVD systems may use blue light, e.g., about 380 nm to about 420 nm, have a numerical aperture of about 0.85, a diffraction limited spot size of about 0.58 µm, a working distance of greater than about 0.3 mm, and a media thickness of about 0.0875 mm. The DVD systems may use red light, e.g., about 630 nm to about 680 nm, have a numerical aperture of about 0.6, a diffraction limited spot size of about 1.32 µm, a working distance of greater than about 0.4 mm, and a media thickness of about 0.6 mm. The CD systems may use infrared (IR) light, e.g., about 780 nm to about 820 nm, have a numerical aperture of about 0.45, a diffraction limited spot size of about 2.11 µm, a working distance of greater than about 0.5 mm, and a media thickness of about 1.2 mm.

One conventional solution includes using one surface having a first phase function providing a high first order efficiency for red and a second phase function providing a high first order efficiency for IR, while providing high zeroth order efficiency for blue. In order to achieve this, a thick DOE needs to be used. For example, to make phase levels that are multiples of $2\pi$ for the blue wavelength, the phase delay for a transmission DOE is given by:

$$2\pi(n-1)d/\lambda \quad (1)$$

where n is the index of refraction of the DOE for blue light, d is the thickness of the DOE and lambda is the wavelength of the blue light. The $2\pi$ thickness D for each wavelength and corresponding refractive index is given by:

$$D=\lambda/(n-1) \quad (2)$$

Thus, for example, if a DOE is designed to transmit 407 nm (blue light), impart the first phase function on 650 nm (red light) and impart the second phase function on 785 nm (IR), since 785 nm is nearly twice 407 nm, levels which effect 785 nm but would not effect 407 nm need to be determined. The phase levels would be determined from integer multiples M of D that do not effect the blue light. For most materials this results in very thick elements with relatively low efficiency, especially in the IR, e.g., less than 50%.

In this current solution using one surface to diffract two of the three wavelengths, phase levels for a first phase function at a first wavelength, e.g., 650 nm, are selected that correspond to a zero phase delay (modulo $2\pi$) or about zero phase delay for the other two wavelengths, e.g., 405 nm and 785 nm. For a second phase function at a second wavelength, e.g., 785 nm, phase levels are chosen to correspond to zero for the other two wavelengths, e.g., 405 nm and 650 nm. Assume the phase levels are provided in a material having no dispersion and a refractive index of 1.46. For simplification, consider only solutions MD for blue light. In designing the second phase function and restricting the multiple of D to M≦40, and then looking for values of M within this range where the phase angle for the red light is less than ±20°, then there are five values for M which satisfy this condition. However, these phase levels also need to provide phase angles close to 0°, 90°, 180° and 270° for a four phase level diffractive for the IR light. Only three of the five values are within ±20° of these target values. A diffractive other than a binary diffractive would thus need to be made with more than a thickness of M=40 at 407 nm, i.e., more than 35 microns thick.

The actual problem is even more severe than in this simplified case, since the refractive index of fused silica actually decreases as wavelength increases, i.e., positive dispersion. Thus, the refractive index of fused silica is actually 1.470 at 405 nm, 1.457 at 650 nm, and 1.453 (at 785 nm). This dispersion results in the blue and IR light becoming even more closely harmonic, as can be seen with reference to the following phase delay ratio of Equation (3):

$$\frac{\lambda_B/(n_B-1)}{\lambda_{IR}/(n_{IR}-1)} \quad (3)$$

Without dispersion, i.e., when $n_B=n_{IR}$, this phase delay ratio is 1.93, while in fused silica, it becomes 2.01. With these refractive indices, when M is selected to be an integer for the blue light, then phase values for the IR light will all be within ±10° of either 0° or 180° for all values of M<75, resulting in a DOE having a thickness of at least 65 microns to realize even a four level DOE.

Thus, when using fused silica, the conventional approach is limited to a binary DOE for IR light, unless a very thick diffractive structure, e.g., much thicker than 65 microns, is used. Such a binary DOE has very low efficiency, roughly 40%, compared with roughly 80% for a four-level DOE. Thicker DOEs have numerous problems, e.g., they are more difficult to fabricate, are more sensitive to changes in wavelength, and have performance issues, e.g., shadowing due to the relative aspect ratios of the etch depth and the period.

SUMMARY OF THE INVENTION

Embodiments of the present invention are therefore directed to a DOE corrector, associated systems and methods, which substantially overcome one or more of the problems due to the limitations and disadvantages of the related art.

It is a feature of an embodiment of the present invention to provide a DOE corrector providing wavelengths at appropriate focal lengths.

It is another feature of an embodiment of the present invention to provide a DOE corrector on a single surface.

It is another feature of an embodiment of the present invention to provide a DOE corrector that is readily manufacturable.

At least one of the above and other features and advantages of the present invention may be realized by providing an optical element, including a substrate including a diffractive structure having multiple periods, at least one period of the multiple periods having multiple steps, heights of the multiple steps non-monotonically increasing across the at least one period.

The substrate may be fused silica. The multiple steps are substantial multiples of $$\frac{\lambda}{(n-1)},$$

where $\lambda$ is a design wavelength. A modulo $2\pi$ of a design wavelength may monotonically increase away from a center of the optical element.

The optical element maybe for use with a first wavelength $\lambda 1$ and a second wavelength $\lambda 2$, and the substrate has an index of refraction n substantially satisfying the following relationship:

$$1.95 \le \frac{\lambda 2}{(n_2 - 1)} \bigg/ \frac{2 * \lambda 1}{(n_1 - 1)} \le 2.05.$$

The optical element as claimed in claim 5, wherein the optical element is for use with a third wavelength $\lambda 3$, between the first wavelength $\lambda 1$ and the second wavelength $\lambda 2$.

The optical element may have an efficiency of at least about 75% for the zero-th order diffraction for the first wavelength and an efficiency of at least about 44% for a first order diffraction for the second wavelength.

The step heights may be within one radian of a harmonic of the first wavelength.

At least one step of the multiple steps in the at least one period may have a higher adjacent step and a lower adjacent step.

Step heights may be substantial harmonics of a design wavelength. A sub-step may be on at least one of the steps. The optical element as claimed in claim 1, wherein step heights in at least one period are offset by less than one radian from substantial harmonics of a design wavelength.

At least one of the above and other features and advantages of the present invention may be realized by providing an optical head, including a light source adapted to output light at a first wavelength and at a second wavelength, a lens adapted to focus light of the first wavelength onto a first optical medium type and light of the second wavelength onto a second optical medium type, an optical element as described above between the light source and the lens, and a detector adapted to detect light of the first wavelength and light of the second wavelength.

The optical element may be adjacent to the lens. The light source may be further adapted to output light of a third wavelength, the lens may be adapted to focus light of the third wavelength on a third optical medium type and the detector may be further adapted to detect light of the third wavelength.

The first wavelength may be the shortest of the wavelengths and the optical element may have step heights that are substantially harmonics of the first wavelength.

The first wavelength may be between about 380 nm to about 420 nm, the second wavelength may be between about 630 nm to about 680 nm, and the third wavelength may be between about 780 nm to about 820 nm.

The optical element and the lens may provide light of the first wavelength with a first focal length and a first numerical aperture, light of the second wavelength with a second focal length and a second numerical aperture, and light of the third wavelength with a third focal length and a third numerical aperture.

BRIEF DESCRIPTION OF THE DRAWINGS

The above and other features and advantages of the present invention will become readily apparent to those of skill in the art by describing in detail embodiments thereof with reference to the attached drawings, in which.

DETAILED DESCRIPTION OF THE INVENTION

Embodiments of the present invention will now be described more fully hereinafter with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art. Like numbers refer to like elements throughout.

As noted above, the use of fused silica for DOE correctors may be problematic when using wavelengths of 405 nm and 785 nm, since the phase delay ratio of these wavelengths in fused silica is very close to 1:2, i.e., making the only manufacturable harmonic structure practical a binary lens, which is very inefficient, e.g., less than 40% for the IR light. Therefore, a solution that can provide a phase delay ratio between two wavelengths of interest that is not so close to a harmonic, while allowing proper diffracting of a third wavelength, is needed.

Figure 1:
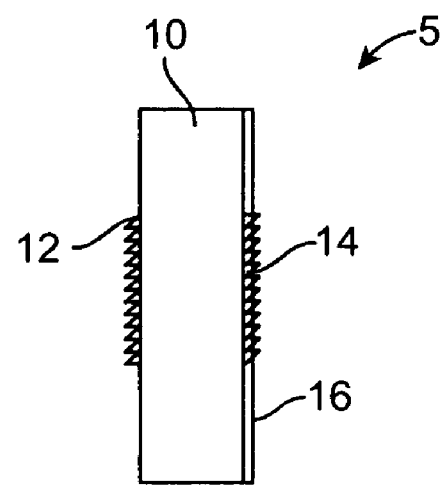
FIG. 1 illustrates a schematic side view of a DOE corrector in accordance with a first embodiment of the present invention.

In order to address the problems of harmonic influence, a DOE corrector 5 in accordance with a first embodiment of the present invention is shown in FIG. 1. The DOE corrector 5 may include a substrate 10 a first diffractive 12 in a first material providing a more harmonic phase delay, i.e., $\frac{\lambda_{IR}}{(n_{IR}-1)} = \frac{2*\lambda_B}{(n_B-1)}$ so the first and third wavelengths are treated substantially equally, and a second diffractive 14 in a second material providing a less harmonic phase delay, so that the first and third wavelengths are treated substantially differently. For example, the substrate 10 may be a harmonic phase delay material, such as fused silica, into which the first diffractive 12 is etched, and then a less harmonic phase delay material 16 may be provided on an opposite side of the substrate 10 in which the second diffractive 14 is formed. For example, an embossable material, such as a polymer, may be used as the less harmonic phase delay material 16, and the second diffractive 14 may be stamped into the embossable material.

Conventionally, when designing a diffractive which is to provide a high efficiency zero-th order beam for a particular wavelength, the etch depths in the diffractive are set to be $2\pi$ multiples for that wavelength, so the diffractive structure essentially does not effect light at that wavelength, i.e., the phase delay will be negligible. In accordance with embodiments of the present invention, in designing the first diffractive 12 for use with the red light, the diffractive etch depths are limited to be $2\pi$ multiples of the IR light, rather than the blue light, since the IR light is practically a harmonic of the blue light. In other words, the diffractive etch depths are limited to be $4\pi$ multiples of the blue light. After determining thickness values that are close to those multiples of $4\pi$, those that also have phase values at or near fractional phase values of $2\pi$ for the red light are chosen. For example, if a sixteen phase level structure is to be provided in fused silica, then the target (modulo $2\pi$) phase values for the red light are given by:

$2\pi*i/16$ (4)

where i varies from 0 to 15.

On the less harmonic phase delay side, the second diffractive element is designed to provide a high efficiency first order for the IR light. The second diffractive element is designed by selecting a maximum phase error for each wavelength not to be effected by the second diffractive element, here the blue and red light. Then, all levels that are equal to integer multiples of $2\pi$, within the maximum phase error, are determined for the blue light. The maximum phase error for each wavelength may be the same. Then, those levels that are not also within a maximum phase error of $2\pi$ for the red light are eliminated. Finally, the remaining levels are then selected in accordance with equation (1) for the IR light. The less harmonic phase delay material may be $TiO_2$, SU-8, ultra-violet (UV) curable polymers, or thermally curable polymers having an appropriate dispersion.

Numerous levels satisfying the above conditions are available for creating both diffractive elements, allowing an efficient DOE corrector to be created. For example, if using fused silica and only diffracting 660 nm into the first order, while 405 nm and 785 nm are substantially directed into the zero-th order, i.e., the etch depths are at $2\pi$ multiples of 785 nm, within a 20 degree error and restricting M to less than twenty, four levels satisfy these requirement, i.e., M=0, M=2, M=14 and M=16 for 405 nm. Better performance may be realized in practice by also considering etch depths that are not exact $2\pi$ multiples of blue light, e.g., within a 20 degree error as for the IR. Using this method, if the maximum etch depth of the fused silica material is nine microns, a practical diffractive optical element may be formed in the fused silica having between four and twelve levels. If the maximum etch depth of the thin film, e.g., a UV curable polymer noted above, is fifteen microns, a diffractive optical element formed therein may have between four and eight levels. Again, the limitations on the etch depth is due to shadowing and vector diffraction effects due to the aspect ratio.

According to a second embodiment of the present invention, the low dispersion material, e.g., the fused silica, may be used to diffract one of the harmonic wavelengths, partially diffract another wavelength and transmit the other harmonic wavelength. Examples of available phase levels in fused silica are provided below in the following Table. All phase delays are given in waves (modulo $2\pi$) and the phase delay is 0 or 1 wave ($2\pi$) for 405 nm.

|  | i | | | | | | | | | |
|---|---|---|---|---|---|---|---|---|---|---|
|  | 0 | 2 | 4 | 6 | 8 | 5 | 7 | 9 | 1 | 3 |
| Step height (microns) | 0 | 1.73 | 3.46 | 5.18 | 6.91 | 4.32 | 6.05 | 7.78 | 0.86 | 2.59 |
| Phase Delay (660 nm) | 0 | 0.2 | 0.4 | 0.6 | 0.8 | 0 | 0.2 | 0.4 | 0.6 | 0.8 |
| Phase Delay (785 nm) | 0 | 0 | 0 | 0 | 0 | 0.5 | 0.5 | 0.5 | 0.5 | 0.5 |

This resultant effective diffractive is equivalent to a five level, evenly spaced diffractive for 660 nm and a binary diffractive for 785 nm.

This structure in fused silica alone may provide sufficient diffraction efficiencies for certain applications. In the above example, the scalar diffraction efficiency for this element is 100% for 405 nm, 87% for 660 nm and 40% for 785 nm. If a higher diffraction efficiency for 785 nm is desired, since the 0 and π levels for 785 nm are now provided in the fused silica element, only a few levels are required in the polymer side to increase the diffraction efficiency for 785 nm. For example, the polymer side may have two levels, e.g., 0 and 0.25 waves, or three levels, e.g., evenly spaced between 0 and 0.5 waves, i.e., 0, ⅙, and ⅓ waves. This would then provide a resultant effective diffractive for 785 nm having a total of four levels or six levels, respectively.

By providing 0 and π levels in the fused silica for 785 nm, the polymer may be made much thinner. For example, in accordance with the first embodiment, using fused silica and a polymer, e.g., a biphasic poroviscoelastic (BPVE) polymer, the fused silica part is 8.7 microns thick and the polymer part is over 16 microns thick. This resulted in a combined diffraction efficiency for the part to be 94%, 81% and 69% for 405 nm, 660 nm and 785 nm, respectively. In accordance with the second embodiment, using the same materials, the fused silica part is 7.78 microns and the polymer part was reduced to 6.34 microns, which provides a phase value of approximately zero radians for both 405 nm and 660 nm, and a phase delay of approximately 0.25 waves for 785 nm. The resultant combined diffraction efficiency is then 96%, 78% and 80% for 405 nm, 660 nm and 785 nm, respectively.

Since both parts in the second embodiment diffract a common wavelength, the alignment between the two elements is more critical than in the first embodiment. The alignment may be realized in numerous manners, e.g., wafer-to-wafer bonding, injection molding the polymer part including alignment features to mate with corresponding features on the fused silica part, injection molding the polymer part around the fused silica part, or replicating the polymer part directly on top of the fused silica part.

Each of the first and second diffractive elements may include a difference between phase levels of more than 2π for at least one of the three different wavelengths. When using more than one material, the second and third wavelengths may have a substantially harmonic relationship, the second and third wavelengths being more harmonic in the first material and less harmonic in the second material. A phase delay ratio between the second and third wavelengths in the second material may be less than about 1.95 or greater than about 2.05. A phase delay ratio between the second and third wavelengths in the first material may be between about 1.95 and about 2.05.

Figure 2:
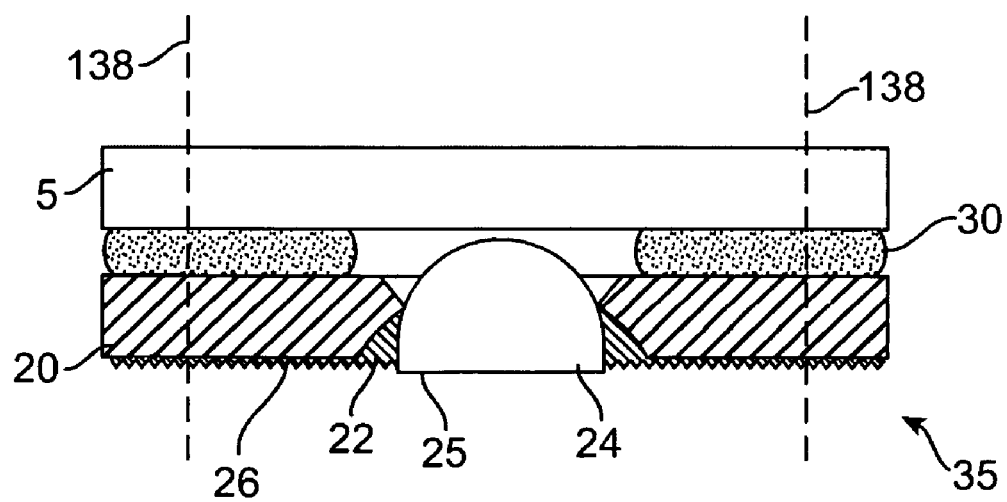
FIG. 2 illustrates a schematic side view of a DOE corrector of FIG. 1 aligned with lens to be corrected.

FIG. 2 illustrates the DOE corrector 5 of FIG. 1 aligned with a lens 24 to be corrected, when the lens 24 is roughly a sphere. Either embodiment may be employed. The general method of alignment is disclosed in U.S. Pat. No. 6,426,829 entitled "Integrated Micro-Optical Subsystems". As can be seen in FIG. 2, a substrate 20 is patterned and etched to form a hole 22 therein. This hole 22 receives the lens 24, which may be secured in the hole by using an adhesive 26, e.g., solder. The lens 24 may be polished to flatten a surface 25 thereof to be about even with a surface of the substrate 20, as shown in FIG. 2, or may remain in its original form. The substrate 20 is then aligned with the DOE corrector 5 and these components may be secured together, e.g., using a bonding material 30, as shown in FIG. 2. The DOE corrector 5 and the substrate 20 may be aligned and secured as a plurality of elements, e.g., on a wafer level. Then, a resultant optical element 35 may be realized by separating the wafer containing multiple resultant optical elements 35 along lines 38.

Thus, in accordance with the first embodiment of the present invention, a DOE corrector for use with three wavelengths may be formed by providing a first diffractive element in a more harmonic phase delay material and a second diffractive element in a less harmonic phase delay material. For example, assuming the harmonic relationships between the wavelengths is two, the phase delay ratio may be less than 1.95 or greater than 2.05 in the less harmonic phase delay material, and within these bounds for the more harmonic phase delay material. The DOE corrector 5 may face either direction. While the DOE corrector 5 shown in FIG. 1 is provided on a single substrate that is embossed on one side, the DOE corrector may be realized in accordance with the present invention by securing substrates of appropriate materials together, or even separated substrates. Further, both the more harmonic and non-harmonic phase delay materials may be provided on opposite sides of a substrate, or the substrate may be the non-harmonic phase delay material.

Figure 3:
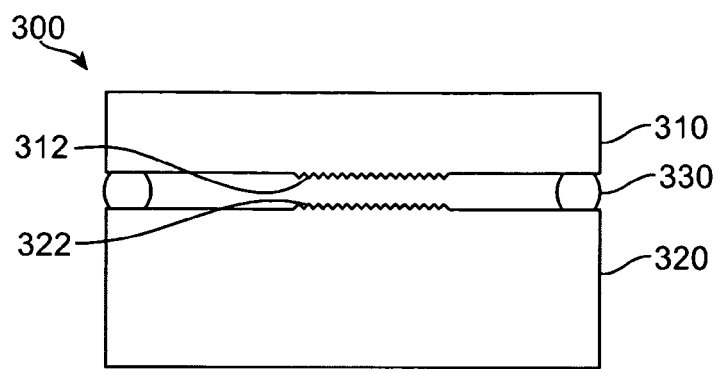
FIG. 3 illustrates a schematic side view of a DOE corrector in accordance with a second embodiment of the present invention.

FIG. 3 illustrates a DOE corrector 300 according to another embodiment of the present invention. As shown in FIG. 3, the DOE corrector 300 may include two substrates 310 and 320, each substrate 310, 320 having a respective diffractive element thereon 312 and 322. In the particular example illustrated in FIG. 3, the two substrates 310 and 320 may be secured with an adhesive material 330 therebetween. Of course, any other suitable securing methods may be used, including providing a spacer wafer therebetween.

Figure 4:
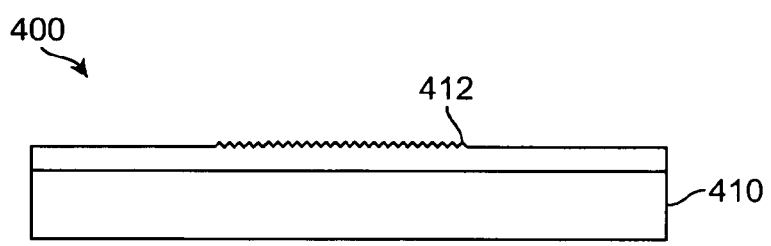
FIG. 4 illustrates a schematic plan view of a DOE corrector in accordance with a third embodiment of the present invention.

FIG. 4 illustrates a DOE corrector 400 as a single diffractive structure. A surface on which the DOE corrector 400 may include a diffractive element 412 in a polymer, e.g. BPVE, provided on a substrate 410, e.g., a glass substrate. As in the previous embodiments, one wavelength, e.g., blue light, may pass straight through the DOE corrector 400, while two other wavelengths are diffracted. When using a single diffractive structure, two phase functions may be multiplexed together. This may result in a thick layer with deep etch depths, e.g., 12-15 micron layer with etch depths up to six microns deep.

In creating the multiplexed phase function, this multiplexed phase function may be determined simultaneously using known algorithms, e.g., using an iterative discrete on-axis (IDO) algorithm, e.g., a radially symmetric (RS) IDO algorithm. Alternatively, the phase at each location may be determined by IDO to generate a lookup table. Then, these two linear phase functions may be combined for sixty-three different combinations of phase values for the other two wavelengths. For example, eight different phase values for red may be quantized. Then, for each of those eight different phase values, eight different values for IR may be determined. Then, for each phase value combination, the etch depth that provides the highest efficiency may be determined and stored.

When using only fused silica, the phase depths of the DOE corrector 400 may be increased to naturally enhance the small difference in refractive indices for the blue and the IR light. However, as noted above, deeper structures require more process development and are subject to more fabrication errors. Further, deeper structures tend to be more sensitive to wavelength changes. However, by differing from a multiple harmonic ideal etch depth for blue light, some blue efficiency may be sacrificed to increase IR and red efficiency.

Additionally or alternatively, two different masks may be used to etched similar blue phase depths, e.g., one mask etched to a phase depth slightly greater than the ideal and another mask etched to a phase depth slightly less than the ideal. The differences may be less than about ⅛ of 2π for the blue light. This may result in macrosteps, i.e., having step heights that are substantially 2π harmonics of the blue light, with a microstep, e.g. having step heights of less than about ⅛ of 2π for the blue light. Of course, not all periods need to have microsteps and/or not all periods need to have step heights differing from a multiple harmonic.

Figure 5A:
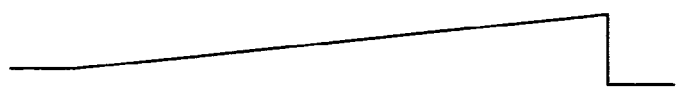
FIGS. 5A to 5B illustrate a partial schematic view of phase functions for different wavelengths.
Figure 5B:
Figure 5C:
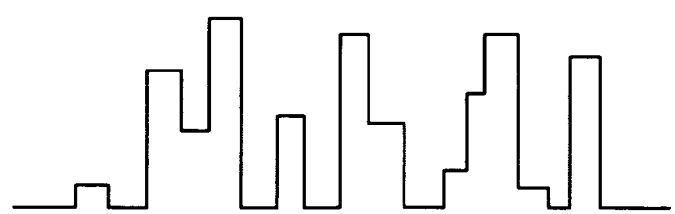
FIG. 5C illustrates a partial schematic view of a diffractive design for a single surface DOE corrector in accordance with embodiments of the present invention.

FIGS. 5A to 5C respectively schematically illustrate, at the same scale, a phase function over the same period providing for a $1^{st}$ order diffraction for red light, a phase function for providing a $16^{th}$ order diffraction for IR, and a resultant diffractive design providing high $0^{th}$ order for blue, $1^{st}$ order for red and $16^{th}$ order for IR. In FIGS. 5A and 5B, the phase functions are illustrated in accordance with their wave (modulo $2\pi$) values, while FIG. 5C illustrates the diffractive in accordance with an actual step height. The single linear grating with a high $0^{th}$ order for blue light is not shown, as it would appear as a flat surface, since the waves are all effectively zero. In this particular example, there are sixteen periods shown in FIG. 5B for the one period shown in FIG. 5A, and 8 periods in FIG. 5C.

As illustrated in FIG. 5A, the phase function providing $1^{st}$ order diffraction for red light may have a slowly varying phase, while, as illustrated in FIG. 5B, the phase function providing $16^{th}$ order diffraction for IR may have a fast (short) grating period and may be equivalent to a blazed grating with a small period, to insure going through all the phase levels for the $1^{st}$ order light. Then, IDO may be used to generate grating periods sampled at, e.g., 64 locations (4 steps for the phase function in FIGS. 5B and 16 for that in FIG. 5A), with a limit on a total depth, to create a look-up table, which may then be applied to actual phase functions. If the optimal etch depths are deeper than $2\pi$, rather than creating a single continuous structure, the phase functions may be quantized for each wavelength. For example, each period may be divided into four or eight steps.

Therefore, the diffractive design for the single diffractive element shown in FIG. 5C may include quantized discrete levels that have a depth that is greater than $2\pi$, where two different phase functions optimize $1^{st}$ and $16^{th}$ orders. As can be seen therein, the diffractive element may include adjacent steps varying by $2\pi$ in either direction and the absolute value of the steps would not be a monotonic function. Where the phase function of the combined diffractive may be monotonically increasing, the etch depths used in the actual implementation would not be. Thus, there may be local maxima and minima.

Figure 6A:
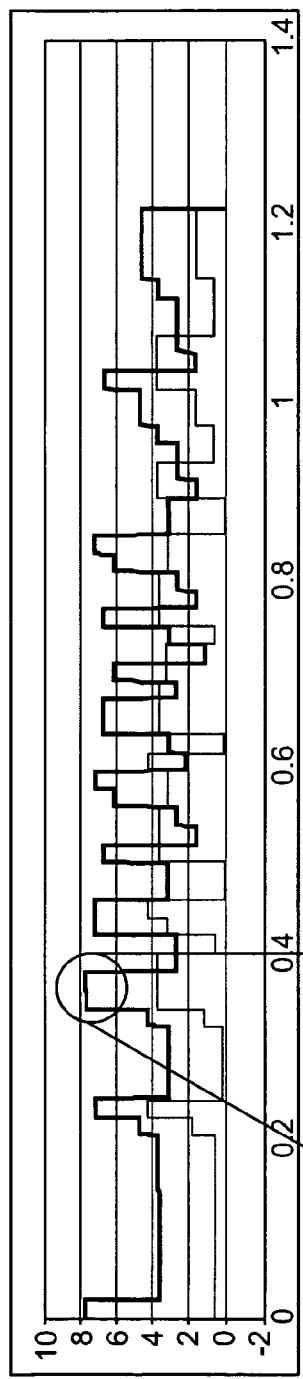
FIG. 6A illustrate alternative etch depths used to design a DOE corrector in accordance with embodiments of the present invention.

FIG. 6A illustrates etch depths for a DOE corrector in accordance with embodiments of the present invention. The x-axis is from a center of the DOE corrector outward in mm and the y-axis is an etch depth (or step height) in microns. The darker plot is of a design having deeper etch depths, e.g., maximum etch depth (step height) of approximately 8 microns, i.e., 10 harmonics of blue, and the lighter plot is of a design having shallower etch depths, e.g., a maximum etch depth (step height) of approximately 4 microns, i.e., 6 harmonics of blue. As can be seen in FIG. 6A, while these structures have features related approximately by a factor of two, the designs are still optimized for the particular designs. Also, as can be seen in FIG. 6A, e.g., around the 0.36 mm point, the step height for both the deep and shallow structures increases slightly, i.e., includes a microstep.

In balancing wavelength sensitivity and overall efficiency, the etch depths may be in the 8-10 harmonic range. For example, 10 harmonics in fused silica may provide an IR efficiency of at least about 64%, a red efficiency of at least about 79% and a blue efficiency of at least about 91%. Thus, the efficiency of a single diffractive surface for all three wavelengths may be greater than at least about 40%, e.g., 44%, 50% or 70%, with the efficiency for the blue light may be at least about 75%, e.g., 90%.

The above designs may also be used with a substrate of a material that is more dispersive than the fused silica, e.g., BPVE polymer, etc. These more dispersive substrates may further improve the IR efficiency. Any suitable, workable material having a phase difference of about 1-2% between the blue and the red and of about 2-3% between the blue and IR may be useful. Further, ideal harmonic quantization for the blue may be employable with such materials.

Figure 6C:
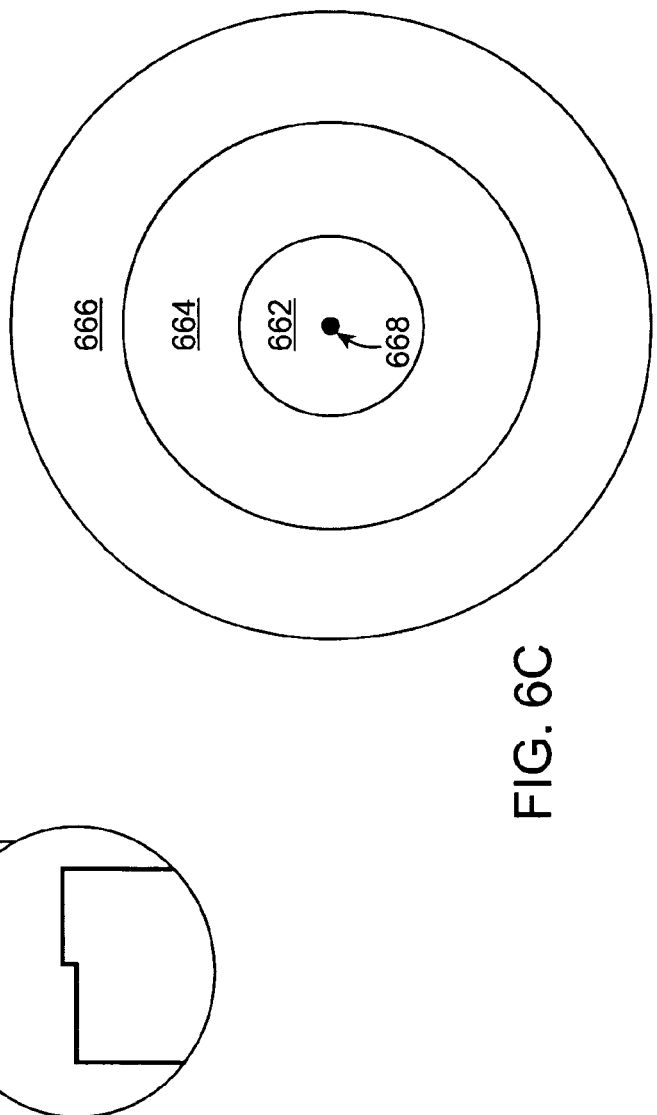
FIG. 6C illustrates a schematic plan view of a DOE corrector in accordance with an embodiment of the present invention.
Figure 6B:
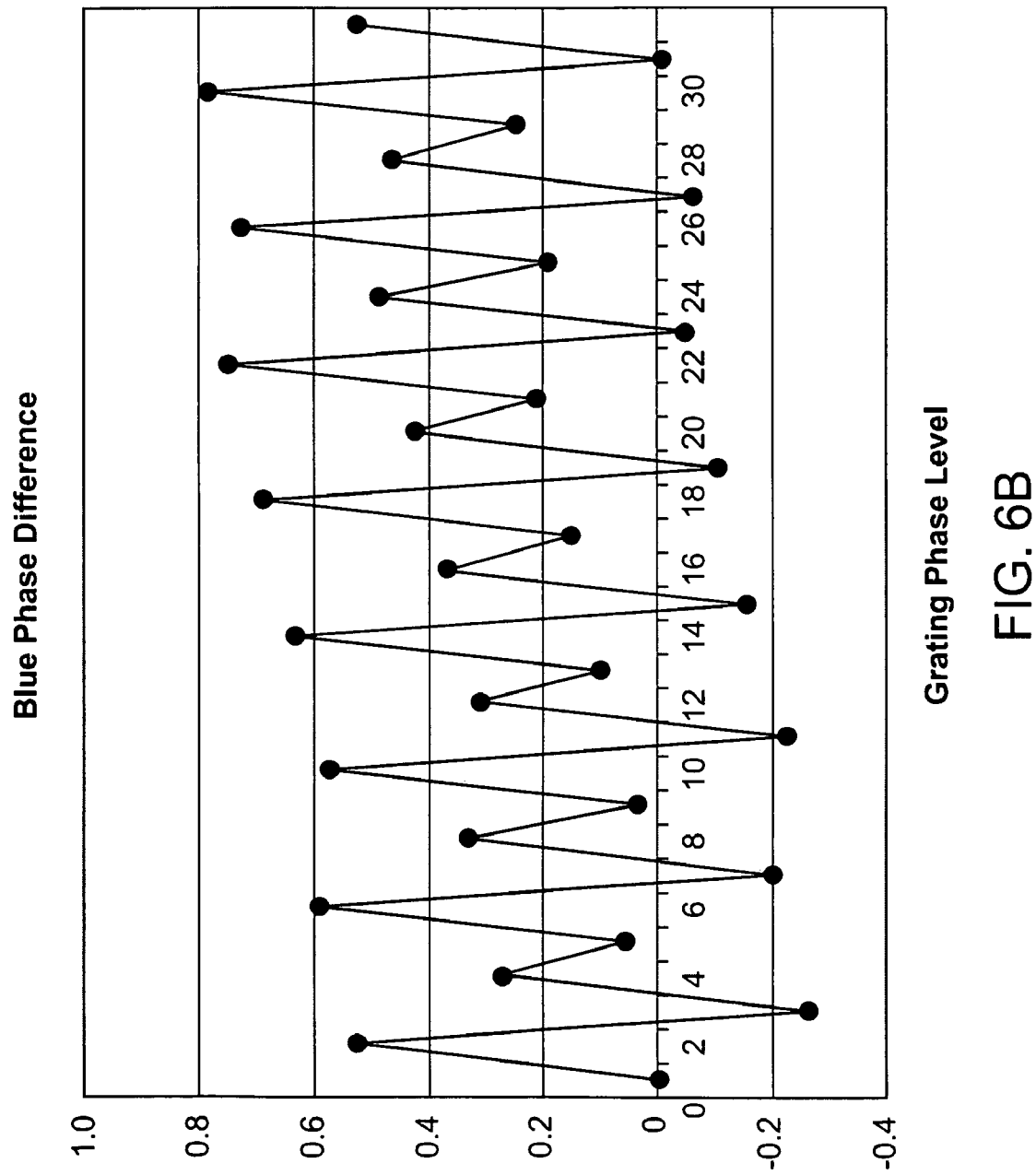
FIG. 6B illustrates a plot of differences in radians between actual and desired phases of a DOE corrector in accordance with an embodiment of the present invention.

FIG. 6B illustrates blue phase differences in radians that may be employed for a design using five masks, i.e., 32 possible phase levels. These differences are between actual and ideal phases, i.e. phase error in an ideal diffractive. In addition to increasing a difference in phase between the blue and the IR, phase offsets may also be chosen to avoid interaction between the red and the IR light. These phase differences may all be less than 1 radian, i.e. ⅙ of a wave. If the offset across the entire element is too high, the efficiency will suffer, i.e., the optical element should appear substantially harmonic to blue light.

FIG. 6C illustrates a schematic plan view of a DOE corrector in accordance with an embodiment of the present invention. Different regions may include different or no diffractive structures, as the different smaller beams will not be incident on these regions. In particular, a central region 662 may be designed for all three wavelengths, an intermediate annulus 664 may be designed for just the red and blue, and an outer annulus 666 may be designed for just the blue, i.e., no diffractive structures. Eliminating the IR may allow use of harmonic gratings and smaller etch depths. Additionally or alternatively, an obscuration 668, e.g., metal, may be at the center of the DOE.

Figure 7:
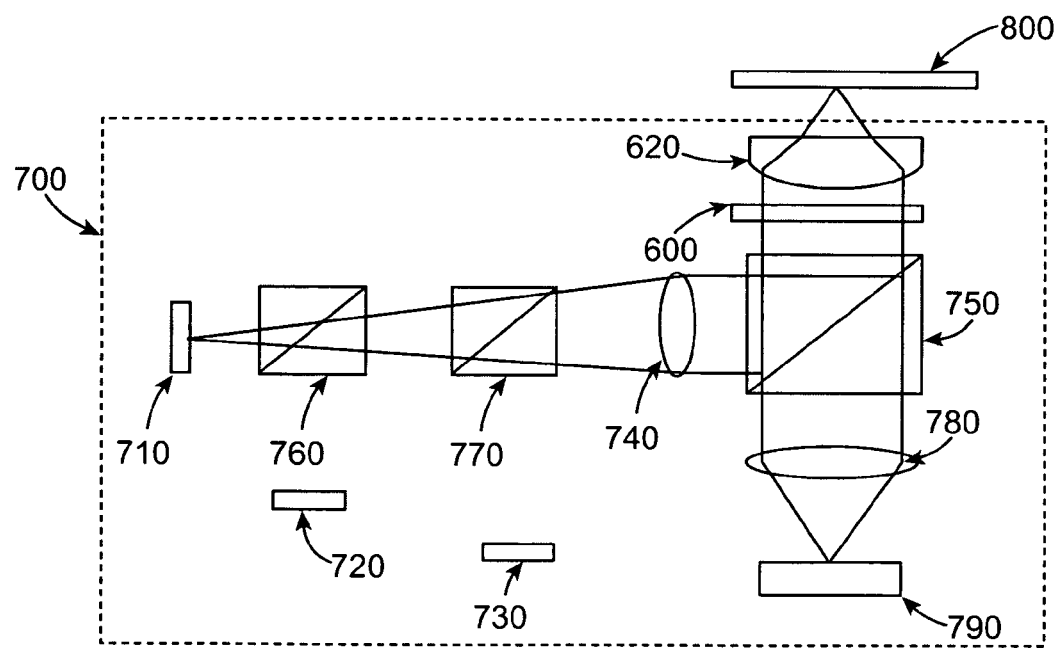
FIG. 7 illustrates a schematic view of an optical head including a DOE corrector in accordance with embodiments of the present invention.

FIG. 7 illustrates a schematic side view of an optical head 700 for use with more than one wavelength having a common DOE corrector 600, made in accordance with any of the above embodiments, and a common objective lens 620. The optical head 700 may be provided adjacent a mount 800 for an optical storage medium.

The optical head 700 may include first through third light sources 710, 720, 730. A first lens 740 may collimate light from any of the first through third light sources, although, in practice, each wavelength may be collimated by an individual lens. The collimated light may be directed by a first beam splitter 750 to the DOE corrector 600 and the objective lens 620, which, in turn, illuminate an optical storage medium on the mount 800. Light reflected by the optical storage medium may pass back through the objective lens 620, the DOE corrector 600 and pass through the first beam splitter 750. The light may be focused by a second lens 780 onto a photodetector 790. In FIG. 7, light is shown being output from the first light source 710.

When the three light sources are separately provided, second and third beam splitters 760, 770 may be included to direct light from the second and third light sources 720, 730 to the first lens 740. Alternatively, a single light source outputting all three wavelengths may be used, and the second and third beam splitters 760, 770 may be eliminated.

Figure 8A:
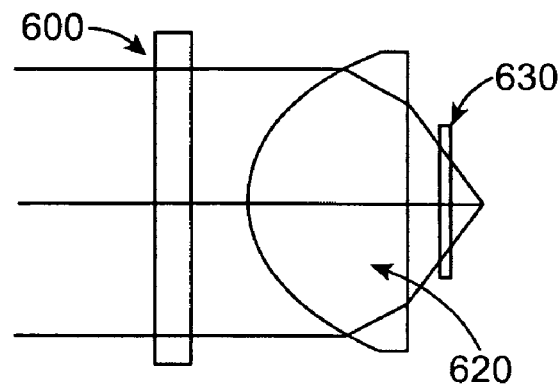
FIGS. 8A to 8C illustrate detailed schematic side views of the DOE corrector and the lens in the optical head of FIG. 7 used with a BD, a DVD and a CD, respectively.
Figure 8B:
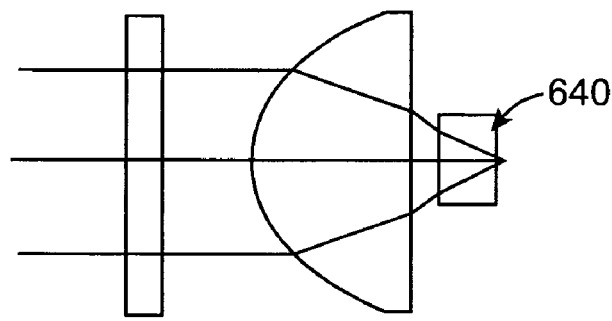
Figure 8C:
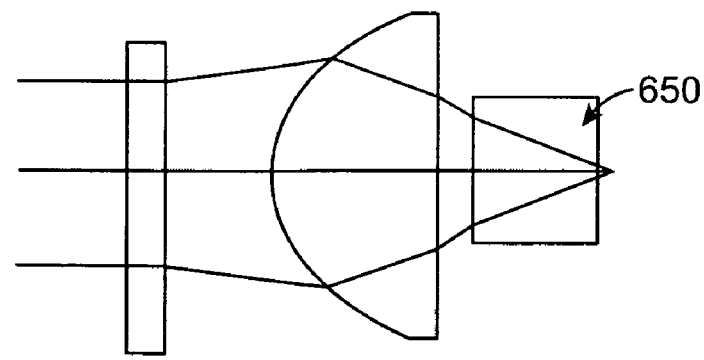

FIGS. 8A to 8C illustrate detailed schematic side views of the DOE corrector 600 and the objective lens 620 for operation with a BD 630, a DVD 640 and a CD 650, respectively. As can be seen therein, the numerical aperture is largest for the BD 630 and the BD 630 is the thinnest of the optical recording media, while the numerical aperture is smallest for the CD 650, which is also the thickest of the optical recording media.

Figure 9:
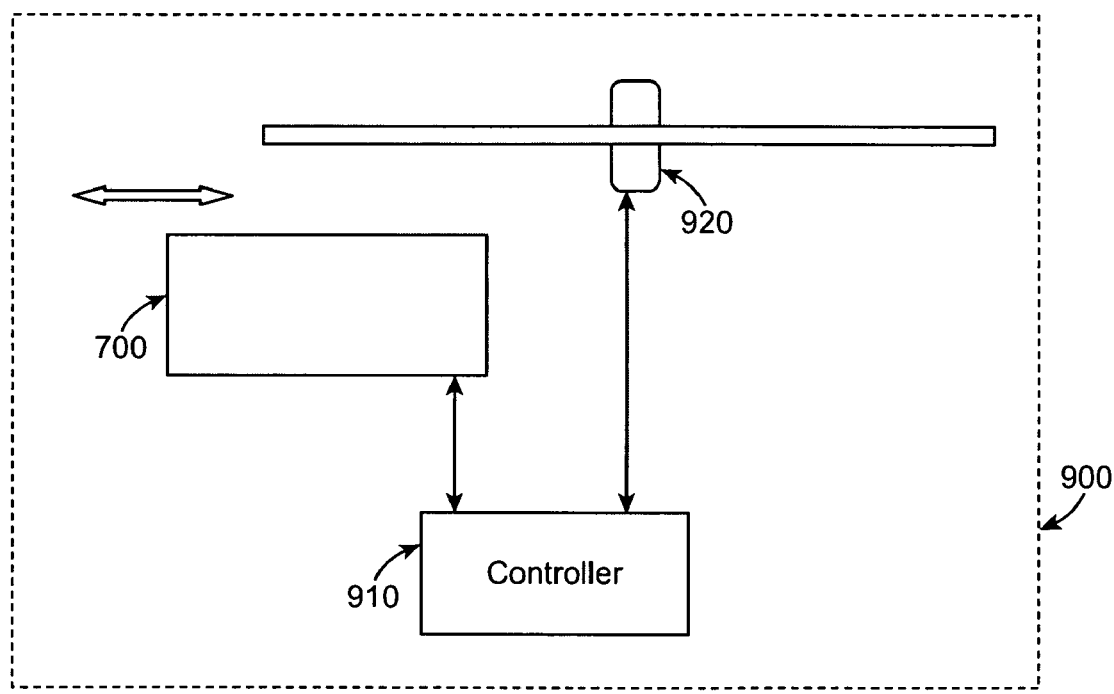
FIG. 9 illustrates a schematic view of an optical disk drive including the optical head of FIG. 7 in accordance with embodiments of the present invention.

FIG. 9 illustrates an optical disk drive 900 including the optical head 700 in accordance with embodiments of the present invention. An optical storage medium may be mounted on a rotator 920. The optical head 700 may be moved relative to the rotator 920 to traverse the optical storage medium. A controller 910 may control focusing, tracking, rotation, and traverse movement. The controller may also reproduce information output from the optical head 700 and may send recording signals to the optical head 700. In accordance with embodiments of the present invention, the optical disk drive may handle different optical media.

Figure 12:
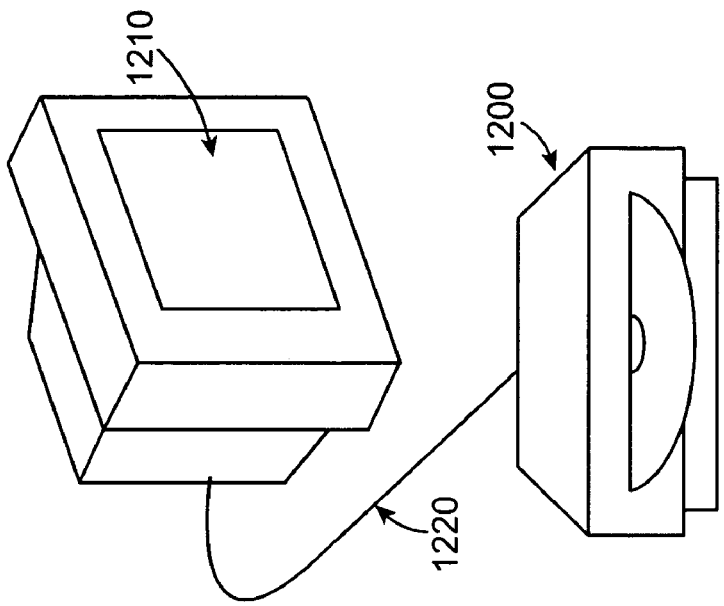
FIG. 12 illustrates a schematic perspective view of a system including the optical disk drive of FIG. 9.
Figure 10:
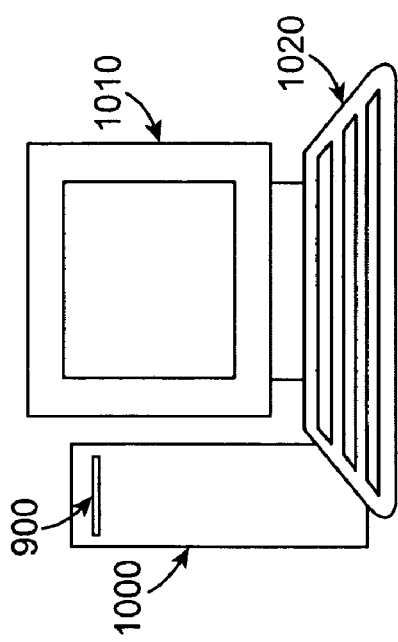
FIG. 10 illustrates a schematic front view of a computer including the optical disk drive of FIG. 9.
Figure 11:
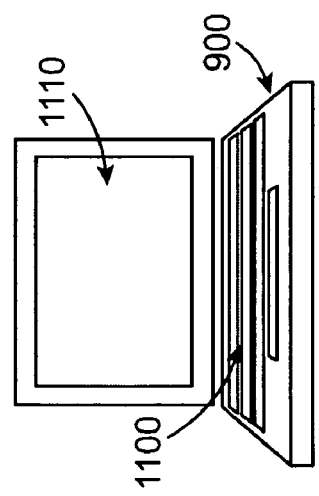
FIG. 11 illustrates a schematic front view of a portable device including the optical disk drive of FIG. 9.

FIG. 10 illustrates a front view of a computer 1000 including the optical disk drive 900, a monitor 1010 and an input device 1020, e.g., a keyboard. FIG. 11 illustrates a front view of a portable device 1100 including the disk drive 900 and a display 1110. The portable device 1100 may be, e.g., a laptop computer or a portable optical disk player/recorder. FIG. 12 illustrates a perspective view of system including an optical disk player/recorder 1200 including the disk drive 900 and a separate display 1210 connected, either with or without a wire 1220 to the optical disk player/recorder.

It is further noted that any of the embodiments of the DOE corrector may be made of the wafer level, i.e., multiple DOE correctors may be made and the separated into individual DOE correctors. Further, as noted above with reference to FIG. 2, the DOE correctors made on the wafer level may be secured, e.g., vertically stacked, with other optical elements for an optical head, before or after such separation occurs. The DOE corrector may be made with any known lithographic techniques, including replication using a lithographically created wafer master. Further, while the refractive lens in FIG. 2 is illustrated as a ball lens, microlenses which may also be created on a wafer level may be used in accordance with the present invention.

To adjust Numerical Aperture (NA) in any of the embodiments, scattering regions can be created to scatter light at the one or both of the longer wavelengths, i.e., at 785 nm or at both 785 and 660 nm, to reduce the effective aperture for these wavelengths. For example, in order to reduce the effective aperture for 785 nm, the above design approach can still be used, but the desired phase function for 785 nm may become a binary grating with a high enough spatial frequency to cause light at 785 nm to be diffracted in to a region large enough to significantly reduce the signal power at the disk.

In any of the above embodiments of the DOE corrector of the present invention, an additional diffractive element may be provided to correct for dispersions, e.g., for minor changes in the wavelength of the blue light, or such correction may be incorporated into one of the diffractive used in the DOE corrector. Such dispersion correction would be to maintain focal lengths at the appropriate position.

In the figures, the dimensions of layers and regions may be exaggerated for clarity of illustration. It will also be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Further, it will be understood that when a layer is referred to as being "under" or "above" another layer, it can be directly under or directly above, and one or more intervening layers may also be present. In addition, it will also be understood that when a layer is referred to as being "between" two layers, it can be the only layer between the two layers, or one or more intervening layers may also be present. As used herein, the term "and/or" includes any and all combinations of one or more of the associated listed items.

It will also be understood that, although the terms "first" and "second" etc. may be used herein to describe various elements, structures, components, regions, layers and/or sections, these elements, structures, components, regions, layers and/or sections should not be limited by these terms. These terms are only used to distinguish one element, structure, component, region, layer and/or section from another element, structure, component, region, layer and/or section. Thus, a first element, structure, component, region, layer or section discussed below could be termed a second element, structure, component, region, layer or section without departing from the teachings of exemplary embodiments.

Spatially relative terms, such as "beneath," "below," "lower," "above," "upper" and the like, may be used herein for ease of description to describe one element or feature relationship to another element(s) or feature(s) as illustrated in the figures. It will be understood that the spatially relative terms are intended to encompass different orientations of the device in use or operation in addition to the orientation depicted in the figures. For example, if the device in the figures is turned over (or upside down), elements or layers described as "below" or "beneath" other elements or layers would then be oriented "above" the other elements or layers. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for exemplary, of manufacturing techniques and/or tolerances, are to be expected. Thus, exemplary embodiments should not be construed as limited to the particular shapes of regions illustrated herein but are to include deviations in shapes that result, for exemplary, from manufacturing. For exemplary, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention have been disclosed herein and, although specific terms are employed, they are used and are to be interpreted in a generic and descriptive sense only and not for purpose of limitation. For example, while a spherical lens has been illustrated, other shapes, using different alignment mechanisms, may be used. Further, the first to third wavelengths are simply meant to differentiate the wavelengths from one another, and do not indicate in particular ordering of the wavelengths with respect to one another. Accordingly, it will be understood by those of ordinary skill in the art that various changes in form and details may be made without departing from the spirit and scope of the present invention as set forth in the following claims.

What is claimed is:

1. An optical element, comprising:
a substrate including a diffractive structure having multiple periods, at least one period of the multiple periods having multiple steps, heights of the multiple steps non-monotonically increasing across the at least one period, wherein at least one period having different multiple steps than other periods, wherein the optical element is for use with a first wavelength $\lambda 1$ and a second wavelength $\lambda 2$, and the substrate has an index of refraction n1 at the first wavelength and an index of refraction n2 at the second wavelength substantially satisfying the following relationship:

$$1.95 \leq \frac{\lambda 2}{(n_2 - 1)} \bigg/ \frac{2 * \lambda 1}{(n_1 - 1)} \leq 2.05.$$

2. The optical element as claimed in claim 1, wherein the substrate is fused silica.

3. The optical element as claimed in claim 1, wherein the multiple steps are substantial multiples of $$\frac{\lambda}{(n-1)},$$

where $\lambda$ is one of the first and second wavelengths.

4. The optical element as claimed in claim 1, wherein a modulo $2\pi$ of a design wavelength monotonically increases away from a center of the optical element.

5. The optical element as claimed in claim 1, wherein the optical element has an efficiency of at least about 75% for the zero-th order diffraction for the first wavelength and an efficiency of at least about 44% for a first order diffraction for the second wavelength.

6. The optical element as claimed in claim 1, wherein step heights are within one radian of a harmonic of the first wavelength.

7. The optical element as claimed in claim 1, wherein the optical element is for use with a third wavelength $\lambda 3$, between the first wavelength $\lambda 1$ and the second wavelength $\lambda 2$.

8. The optical element as claimed in claim 1, wherein at least one step of the multiple steps in the at least one period has a higher adjacent step and a lower adjacent step.

9. The optical element as claimed in claim 1, wherein step heights effectively form a binary diffractive for one of the first and second wavelengths.

10. The optical element as claimed in claim 9, wherein step heights provide evenly spaced phase delays for another of the first and second wavelengths.

11. The optical element as claimed in claim 1, wherein step heights in at least one period are offset by less than one radian from substantial harmonics of one of the first and second wavelengths.

12. The optical element as claimed in claim 11, wherein a majority of step heights in the optical element are offset by less than one radian from substantial harmonics of the one of the first and second wavelengths.

13. An optical head, comprising:
a light source adapted to output light at the first wavelength and at the second wavelength;
a lens adapted to focus light of the first wavelength onto a first optical medium type and light of the second wavelength onto a second optical medium type;
an optical element as recited in claim 1 between the light source and the lens; and
a detector adapted to detect light of the first wavelength and light of the second wavelength.

14. The optical head as claimed in claim 13, wherein the optical element is adjacent to the lens.

15. The optical head as claimed in claim 13, wherein the light source is further adapted to output light of a third wavelength, the lens is adapted to focus light of the third wavelength on a third optical medium type and the detector is further adapted to detect light of the third wavelength.

16. The optical head as claimed in claim 15, wherein the first wavelength is the shortest of the wavelengths and the optical element has step heights that are substantially harmonics of the first wavelength.

17. The optical head as claimed in claim 15, wherein the first wavelength is between about 380 nm to about 420 nm, the second wavelength is between about 630 nm to about 680 nm, and the third wavelength is between about 780 nm to about 820 nm.

18. The optical head as claimed in claim 15, wherein the optical element and the lens provide light of the first wavelength with a first focal length and a first numerical aperture, light of the second wavelength with a second focal length and a second numerical aperture, and light of the third wavelength with a third focal length and a third numerical aperture.

19. The optical head as claimed in claim 13, wherein the first wavelength is the shortest wavelength of the wavelengths and the optical element has step heights that are substantially harmonics of the first wavelength.

20. The optical head as claimed in claim 19, wherein the first wavelength is between about 380 nm to about 420 nm, the second wavelength is between about 630 nm to about 680 nm.

21. The optical head as claimed in claim 13, wherein the optical element and the lens provide light of the first wavelength with a different focal length and numerical aperture than light of the second wavelength.

22. The optical element as claimed in claim 1, wherein a modulo $2\pi$ of one of the first and second wavelengths changes as a function of radius of the optical element.

* * * * *